2 Sheets--Sheet 1.

D. W. HERN & P. RICHARDS.
Wagon-Seat.

No. 168,490.                Patented Oct. 5, 1875.

WITNESSES
Robert Everett
George E. Upham

INVENTORS
David W. Hern,
Paul Richards,
Chipman Hosmer & Co,
ATTORNEYS

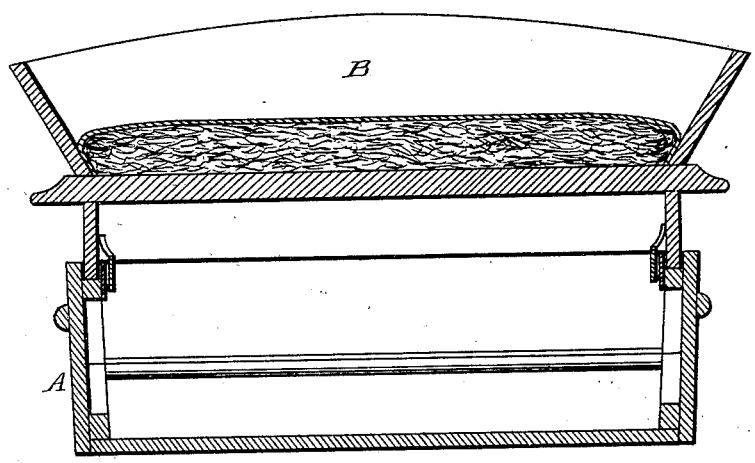

UNITED STATES PATENT OFFICE.

DAVID W. HERN AND PAUL RICHARDS, OF MINNEAPOLIS, MINNESOTA.

IMPROVEMENT IN WAGON-SEATS.

Specification forming part of Letters Patent No. 168,490, dated October 5, 1875; application filed July 17, 1875.

*To all whom it may concern:*

Be it known that we, DAVID W. HERN and PAUL RICHARDS, of Minneapolis, in the county of Hennepin and State of Minnesota, have invented a new and valuable Improvement in Changeable Front Seats to Buggies; and we do hereby declare that the following is a full, clear, and exact description of the construction and operation of the same, reference being had to the annexed drawings making a part of this specification, and to the letters and figures of reference marked thereon.

Figure 1:
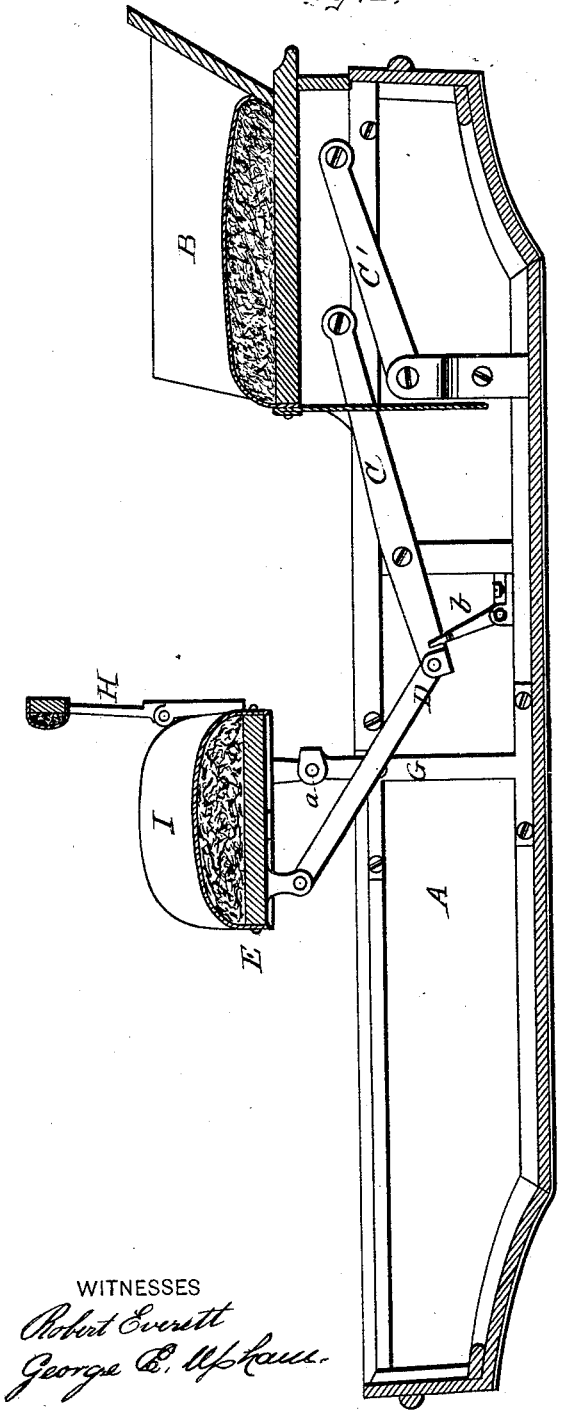
Figure 2:
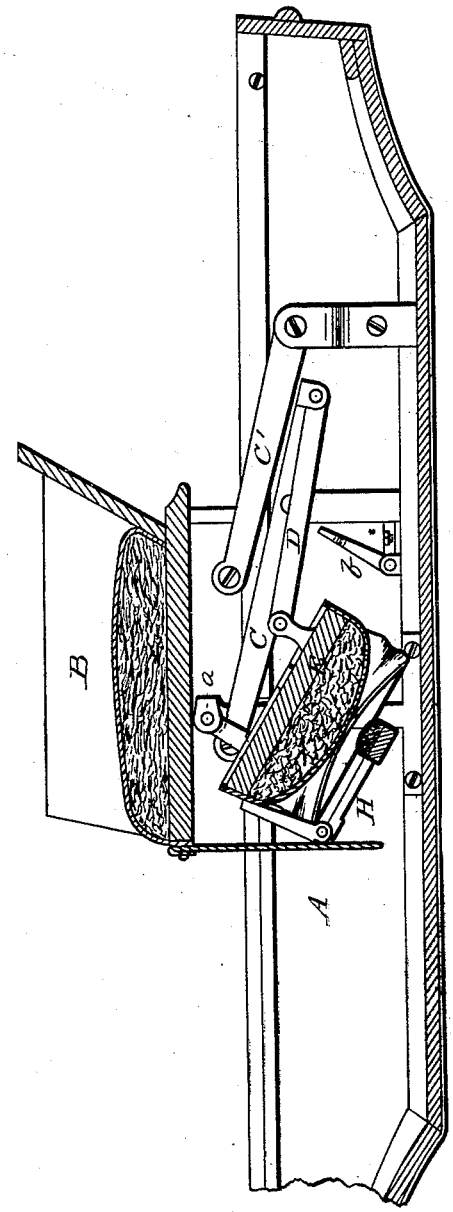

Figures 1 and 2 of the drawings are representations of longitudinal vertical sections of our buggy-seat, and Fig. 3 is a transverse vertical sectional view thereof.

Our invention relates to that class of carriage-seats which are known by the name of "jump-seats," or such seats that can be moved forward or backward to use a front seat or not, as desired; and it consists in the novel construction and arrangement of the parts, as will be hereinafter more fully set forth.

In the annexed drawings, A represents the body of a buggy or other vehicle. B is the rear or jump seat, which is, as is usual in this class of seats, pivoted to two arms, $c\,c'$, at each side or end, and the lower ends of said arms pivoted to the inside of the carriage-body, admitting of the seat being placed either on the back part of the body or over the center thereof, according as a front seat is required or not. The front arm C on each side is extended beyond its pivot point to the body, and the lower extended end of said arm is pivoted to another arm, D, which is connected to the front seat E by being pivoted to ears thereon near the front edge. Near the rear edge, on each side, this front seat E is supported upon a standard, G, secured to the body A, and jointed near its upper end at $a$. When both seats are used, and it is desired to use only one, the rear seat B is raised up and thrown forward in the usual manner. During this movement of the rear seat the front seat is drawn by the arms C D downward from the front, turning upon the joints $a$, and when the rear seat gets in position the front seat will be turned upside down, and be directly under the rear seat. In like manner when the rear seat B is thrown backward again the front seat turns up again in proper position for use. A latch, $b$, pivoted to the body A, is then placed against the joint of the arms C D, to hold the seat firm. Such latch may be used on either or both sides, as desired.

The front seat E is provided with a hinged back, H, folding forward, and at each side is a curved folding side rest, I.

What we claim as new, and desire to secure by Letters Patent, is—

The latch $b$, in combination with the arms C D, connecting the seats B and E, for the purpose described.

In testimony that we claim the above we have hereunto subscribed our names in the presence of two witnesses.

DAVID W. HERN.

PAUL $\underset{\text{mark.}}{\overset{\text{his}}{+}}$ RICHARDS.

Witnesses:
 J. GUILFORD,
 MAGGIE MILLER.